United States Patent [19]
Klees

[11] Patent Number: 5,291,220
[45] Date of Patent: Mar. 1, 1994

[54] THERMAL PRINTER WITH IMAGE SIGNAL PROCESSING

[75] Inventor: Kevin J. Klees, Rochester, N.Y.

[73] Assignee: Eastman Kodak Company, Rochester, N.Y.

[21] Appl. No.: 13,137

[22] Filed: Feb. 3, 1993

Related U.S. Application Data

[63] Continuation of Ser. No. 539,257, Jun. 18, 1990, abandoned.

[51] Int. Cl.⁵ ............................................... B41J 2/36
[52] U.S. Cl. .............................................. 346/76 PH
[58] Field of Search ................................ 346/76 PH

[56] References Cited

U.S. PATENT DOCUMENTS

| | | | |
|---|---|---|---|
| 3,975,707 | 8/1976 | Ito | 346/76 PH |
| 4,391,535 | 7/1983 | Palmer | 346/76 PH |
| 4,516,135 | 5/1985 | Todoh | 346/76 PH |
| 4,524,367 | 6/1985 | Horiya et al. | 346/76 PH |
| 4,540,991 | 9/1985 | Kariya et al. | 346/76 PH |
| 4,567,488 | 1/1986 | Moriguchi et al. | 346/76 PH |
| 4,590,487 | 5/1986 | Noguchi et al. | 346/76 PH |
| 4,594,501 | 6/1986 | Culley et al. | 346/76 PH |
| 4,679,055 | 7/1987 | Inui et al. | 400/120 |
| 4,688,051 | 8/1987 | Kawakami et al. | 346/76 PH |
| 4,724,336 | 2/1988 | Ichikawa et al. | 346/76 PH |
| 4,724,446 | 2/1988 | Hirahara et al. | 346/76 PH |
| 4,746,931 | 5/1988 | Okuda | 346/76 PH |
| 4,748,455 | 5/1988 | Mori | 346/76 PH |
| 4,774,528 | 9/1988 | Kato | 346/76 PH |
| 4,784,501 | 11/1988 | Takami et al. | 346/76 PH |
| 4,786,917 | 11/1988 | Hauschild | 346/76 PH |
| 4,816,843 | 3/1989 | Sasaki | 346/76 PH |
| 4,855,840 | 8/1989 | Kimura et al. | 346/76 PH |
| 4,870,428 | 9/1989 | Kuwabara et al. | 346/76 PH |

*Primary Examiner*—Benjamin R. Fuller
*Assistant Examiner*—Huan Tran
*Attorney, Agent, or Firm*—Thomas H. Close

[57] ABSTRACT

A thermal printer for printing a continuous tone image includes an image signal source, a thermal printhead for printing one line of image pixels at a time, and an image signal converter that transforms each line of image signals into print pixels that are applied to the heat elements of the printhead. The image signal converter includes an image memory that stores the set of successive lines of image pixel signals for the entire image obtained from an image source and a memory for storing a subset of the successive lines. A control processor transfers the set of successive image signal lines to the image memory and then sequentially transfers one successive line at a time to the subset memory. The stored subset comprises the line of image pixel signals being converted, a plurality of lines of image pixel signals preceding the line of image pixel signals being converted and a plurality of lines of image pixel signals succeeding the line of image signals being converted. An image signal processor cooperates with the subset memory to modify the image pixel signals of the image signal line being converted in response to the image signals of the line of image signals being converted, the image signals of the plurality of image signal lines preceding the image signal line being converted and the plurality of image signal lines succeeding the line of image signals being converted.

1 Claim, 8 Drawing Sheets

THERMAL PRINTER WITH IMAGE SIGNAL PROCESSING

This is a continuation of application Ser. No. 07/539,257, filed Jun. 18, 1990 now abandoned.

FIELD OF THE INVENTION

The invention relates to thermal printers and more particularly to processing of image signals for thermal printing.

BACKGROUND OF THE INVENTION

A thermal printhead generally comprises a row of closely spaced resistive heat generating elements which are selectively energized to record data in hard copy form. The data may comprise text, bar code or pictorial information. In operation, the thermal printhead heating elements selectively receive energy from a power supply through control circuits in response to the stored data information. The heat from each energized element may be applied directly to thermal sensitive material. Alternatively, the heat may be applied to a dye coated web to transfer the dye to paper or other receiver material.

In dye transfer printers, the density of the printed dye is a function of the temperature of the heat element and the time the dye coated web or carrier is heated. The quantity of dye transferred to an image pixel of the receiver is directly related to the amount of heat supplied to the carrier. By varying the heat applied by each heating element to the carrier, a variable dye density image pixel is formed in the receiver. In this way, a continuous tone image may be produced. Such continuous tone apparatus can be used to print both monochrome and color images. For monochrome images, a single image with a black dye is printed. For color images, a cyan, magenta and yellow or a blue, green and red system may be used. In one multiple pass arrangement, a cyan image is printed first. Magenta and yellow images are then superimposed on the cyan image to form the color print. Single pass systems may also be used.

Multiple gray scale images produced by thermal printers generally do not provide optimum sharpness and may include unwanted artifacts. Image signal alteration is usually needed to obtain satisfactory printed images. Some thermal image printers that support multiple gray levels contain a simple edge enhancement capability. By using a few neighboring pixels on a single line to perform enhancement, processing and memory requirements are kept to a minimum. These printers may also perform corrections for differences in the optical density produced by the head elements. U.S. Pat. No. 4,774,528 (issued to Nobuhisa Kato on Sep. 27, 1988), for example, discloses thermal recording apparatus in which the black density of pixels to be recorded by thermal recording elements are compared to reference density levels. A value representing the number of pixels having density levels in certain ranges as a result of the comparison is accumulated. The density value range is used to adjust the pulse width of energizing pulses. In this way, compensation is provided for voltage fluctuations at the printhead heat elements due to the number of recording elements energized at one time.

U.S. Pat. No. 4,746,931 (issued to Akira Okuda on May 24, 1988) discloses a thermal head temperature control device having a programmed processor with fixed data stored for bar code and ordinary character printing. The fixed data is selected as a function of the print type to control the power supplied to the heat elements of a thermal printhead. There is no arrangement, however, for altering image signals in response to the values of individual pixel image signals to control printing.

U.S. Pat. No. 4,786,917 (issued to Edward A. Hauschild on Nov. 22, 1988) discloses a signal processing arrangement for a thermal printer which incorporates a programmed processor. The processor sets up lookup tables to correct contrast and color of image signals to be applied to a thermal printhead. The image signals are then modified in response to the difference between corresponding image signals for the present print line and the immediately preceding print line to provide edge enhancement.

The aforementioned patents describe techniques that improve thermal printing by modifying the image signals of the print line being applied to the thermal printhead. The modifications are made in response to the type of pixel image signals of the print line currently being applied to the thermal printhead or in response to the values of the pixel image signals of the current print line and immediately preceding print line. It is well known, however, that each pixel of an image is related to surrounding pixels of more remote print lines both preceding and succeeding the current print line. Consequently, improvement in the print image based on pixels of immediately successive pairs of print lines is limited. It is desirable, therefore, to further improve thermal printer images by modifying each pixel image signal in response to the values of the surrounding pixel image signals in a plurality of preceding and succeeding print lines.

SUMMARY OF THE INVENTION

The present invention is directed to apparatus for printing a continuous tone image having an image signal source that generates a set of successive lines of image pixel signals corresponding to the continuous tone image. A signal converter coupled to the image signal source converts each successive line of image pixel signals into a line of print pixel signals, and a thermal printhead having a line of heating elements coupled to the signal converter prints the successive lines of print pixel signals one line at a time. The signal converter receives the successive lines of image signals from the image signal source and stores the set of successive lines of image signals corresponding to the entire continuous tone image from the image signal source in a first memory. A second memory stores a subset of the lines of image pixel signals from the first storing means including the line of image pixel signals being converted, a plurality of lines of image pixel signals preceding the line of image pixel signals being converted and a plurality of lines of image pixel signals succeeding the line of image signals being converted. A signal processor modifies the image pixel signals of the image signal line being converted in response to the image signals of the line of image signals being converted, the image signals of the plurality of image signal lines preceding the image signal line being converted and the plurality of image signal lines succeeding the line of image signals being converted.

In accordance with one aspect of the invention, a set of convolution coefficient signals is stored and the image pixel signals of the image line being converted are convolved with the image pixel signals of the image signal line being converted, the plurality of preceding image signal lines and the plurality of succeeding image signal lines.

In accordance with another aspect of the invention, a set of color correction signals is stored and the image pixel signal modifying means is responsive to the image pixel signals of the image signal line being modified and the color correction coefficient signals to form a line of color corrected pixel signals.

In accordance with yet another aspect of the invention, a set of printhead heat element correction coefficient signals is stored, and the image pixel signal modifying means is responsive to the image signals of the image signal line being modified and the set of printhead correction coefficient signals to produce a line of printhead corrected pixel signals.

According to yet another aspect of the invention, a signal representative of resolution of the printhead is stored and the resolution of the continuous tone image is determined. The signal processor is responsive to detection of a difference between the resolution of the continuous tone image and the resolution of the printhead to resample the image pixel signals of the continuous tone image to form print pixel signals at the resolution of the printhead. In the resampling, each print pixel signal is a prescribed weighted average of the surrounding image pixel signals.

Viewed from another aspect, the invention is directed to a method for converting successive lines of image signals from an image signal source into a line of print pixel signals to drive a thermal printhead in apparatus for printing a continuous tone image in which the set of successive lines of the entire continuous tone image are received and stored. A subset of the successive lines of image signals including the line of image pixel signals being converted, a plurality of lines of image pixel signals preceding the line of image signals being converted and a plurality of lines of image signals succeeding the line of image signals being converted. The image pixel signals of the image signal line being converted is modified in response to the image pixel signals of the image signal line being converted, the plurality of image signal lines preceding the image signal line being converted, and the plurality of image signal lines succeeding the line of image signals being converted.

In an illustrative embodiment of the invention, a thermal printer for producing a continuous tone hard copy print of an image comprises a thermal printhead having a row of heat elements for printing a line of the image at a time, an interface that receives a set of successive lines of image signals, and an image signal processor coupled between the receiving means and the printhead that converts the successive lines of image signals to successive lines of print pixel signals one line at a time. An image memory coupled to the interface by a control processor stores the received set of image signal lines of the entire image, and a printhead modulator coupled between the image signal processor and the thermal printhead generates printhead drive signals in response to the print pixel signals of the successive lines. The image signal processor stores a subset of the successive lines of image signals including the line of image signals being converted, a plurality of image signal lines preceding the line of image signals being converted, and a plurality of image signal lines succeeding the line of image signals being converted. The image signal processor is adapted to modify the image signals of the image signal line being converted in response to the image signals of the line of image signals being converted, the plurality of image signal lines preceding the line of image signals being converted, and the plurality of image signal lines succeeding the line of image signals being converted.

The invention will be better understood from the following more detailed description taken with the accompanying drawings and claims.

DETAILED DESCRIPTION

Figure 1:
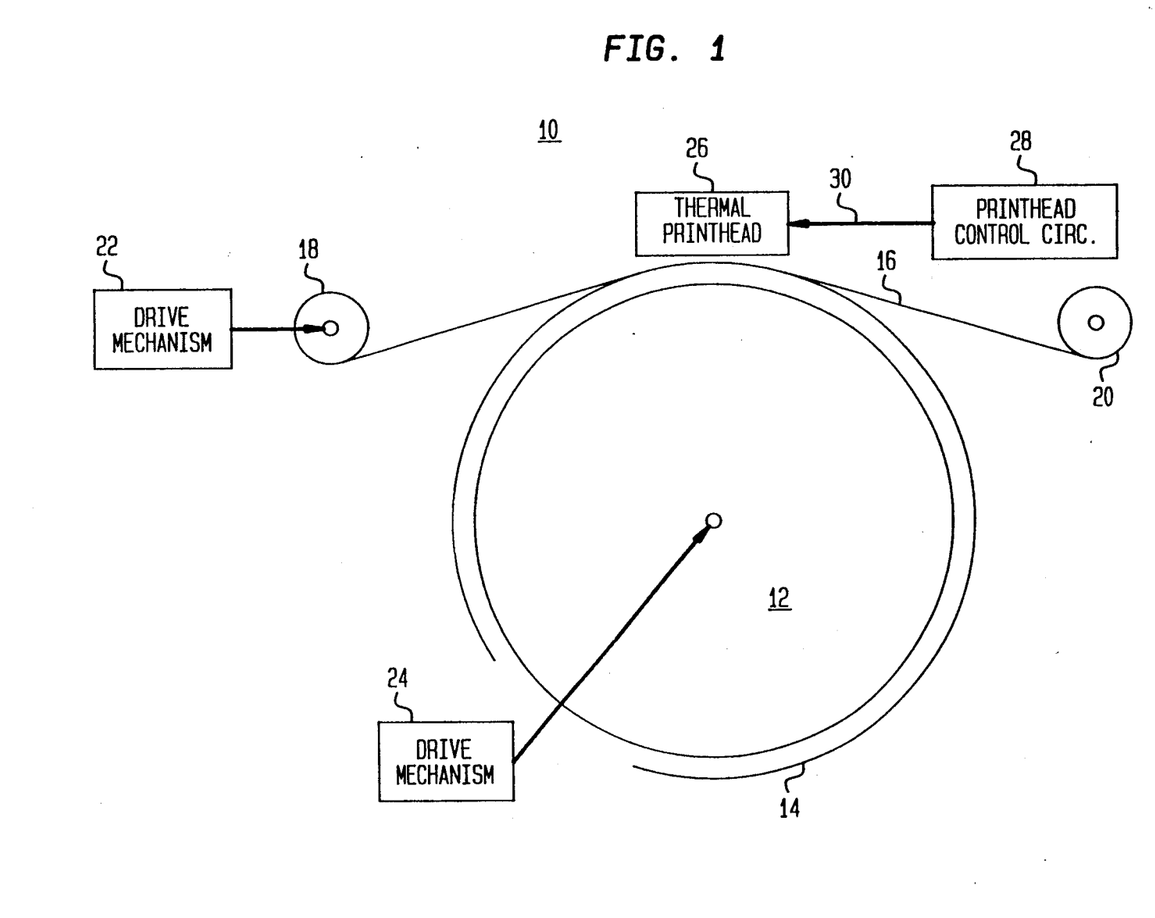
FIG. 1 is a general schematic and block diagram of a thermal printer in which the invention is employed.

Referring now to FIG. 1, there is shown dye transfer thermal printer apparatus 10 in which the present invention may be employed. The thermal printer apparatus 10 comprises a rotatable drum 12, a receiver member 14 in the form of a sheet, drive mechanisms 22 and 24, a carrier member 16 in the form of a web, a supply roller 20, a take-up roller 18, a thermal printhead 26 and a printhead control circuit 28. The printhead control circuit 28 comprises a power supply, an image data source and a control pulse generator which are all not shown. The drive mechanism 22 comprises a motor (not shown) mechanically coupled to the take-up roller 18. The carrier member 16 is disposed between the supply roller 20 and the take-up roller 18 and passes between the printhead 26 and the receiver member 14. The drive mechanism 24 comprises a motor (not shown) that is mechanically coupled to the rotatable drum 12. The receiver member 14 is secured to the drum 12. The thermal printhead 26 comprises a plurality of resistive heat elements (not shown). The printhead control circuit 28 is electrically coupled via conductors 30 to the thermal printhead 26.

The printhead 26 is stationary and its resistive heat elements press against the carrier member web 16. Drive mechanisms 22 and 24 cause the take-up roller 18 and the drum 12 to rotate and thereby advance the carrier member web 16 and the receiver member 14. In operation, the heat elements of the printhead 26 are selectively energized in accordance with data from the printhead control circuit 28 as the drum 12 and the take-up roller 18 are continuously advanced. As a result, the image defined by the data from the printhead control circuit 28 is placed on the receiver member 14. The arrangement of FIG. 1 is similar to that described and illustrated in the aforementioned U.S. Pat. No. 4,786,917. For color printing, the carrier web 16 comprises a plurality of color dye sections. The color dye sections may be successive for multiple pass arrangements.

Figure 2:
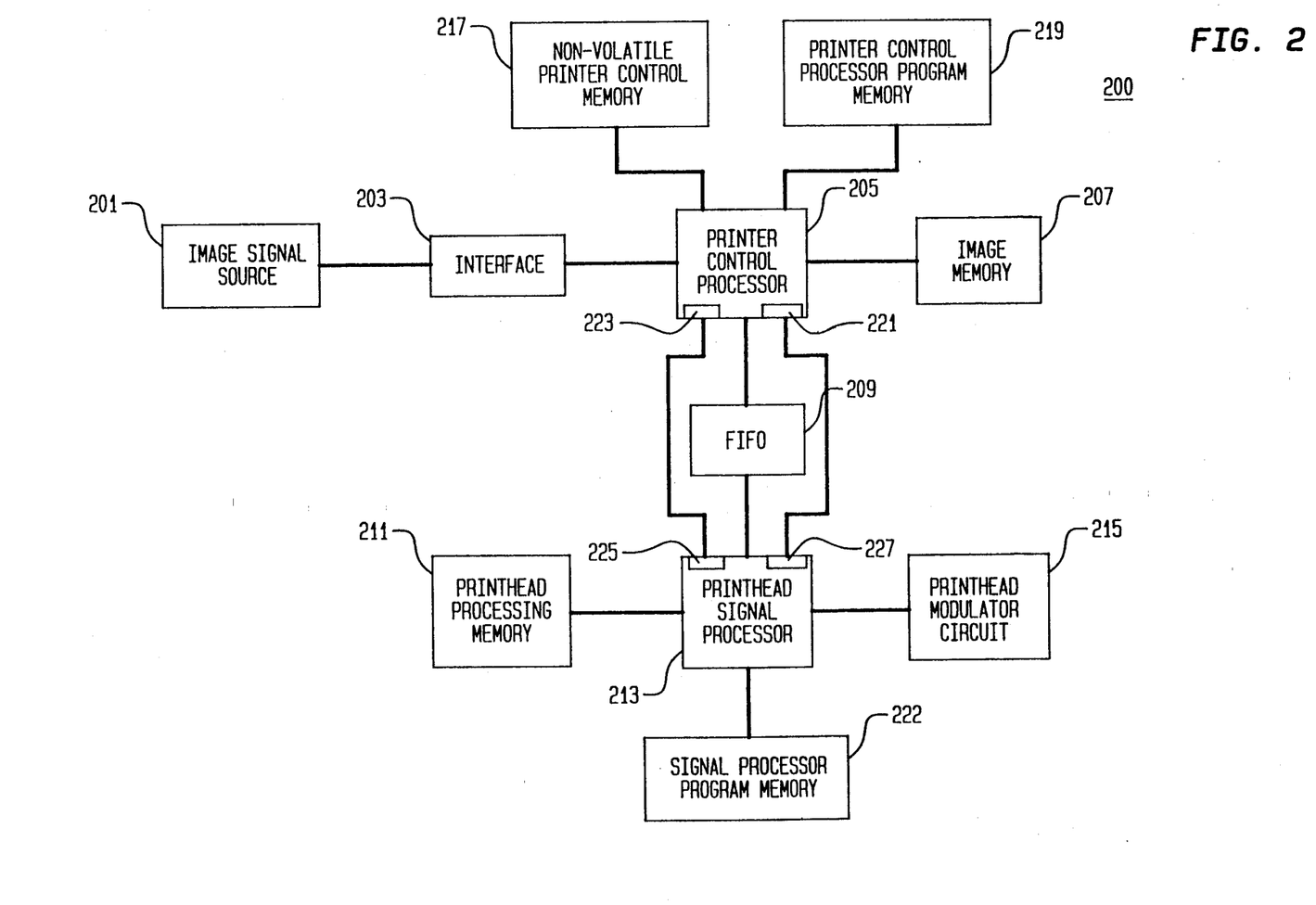
FIG. 2 is a block diagram of an embodiment of a printhead control circuit of FIG. 1 in accordance with the present invention.

Referring now to FIG. 2, there is shown a block diagram of a printhead control circuit embodiment 200. The printhead control circuit 200 can illustratively be used as the printhead control circuit 28 of FIG. 1. The printhead control circuit 200 comprises an image signal source 201, an interface 203, a printer control processor 205, an image memory 207, a non-volatile printer control memory 217, a first in first out (FIFO) coupler 209, a printhead processing memory 211, a printhead signal processor 213, a printer control processor program memory 219, a signal processor program memory 222, and a printhead modulator circuit 215. The printer control processor 205 comprises a command sending port 223 and a status receiving port 221. The printhead signal processor 213 comprises a command receiving port 225 and a status sending port 227.

The image signal source 201 is coupled to a first terminal of the interface 203. A second terminal of the interface 203 is coupled to a first terminal of the printer control processor 205. A second terminal of the printer control processor 205 is coupled to the image memory 207. A third terminal of the printer control processor 205 is coupled to the non-volatile printer control memory 217. A fourth terminal of the printer control processor is coupled to a first terminal of the FIFO coupler 209. A fifth terminal of the printer control processor is coupled to the printer control processor program memory 219. The command sending port 223 of the printer control processor 205 is coupled to the command receiving port 225 of the printhead signal processor 213. The status receiving port 221 of the printer control processor 205 is coupled to the status sending port 227 of the printhead signal processor 213. A second terminal of the FIFO coupler 209 is coupled to a first terminal of the printhead signal processor 213. A second terminal of the printhead signal processor 213 is coupled to the printhead processing memory 211, a third terminal of the printhead signal processor 213 is coupled to the printhead modulator circuit 215, and a fourth terminal of the printhead signal processor is coupled to the signal processor program memory 222.

The non-volatile printer control memory 217 stores a set of color correction coefficient signals, a set of printhead correction signals, and a set of convolution filter coefficient signals. The printer control processor program memory 219 is a read only memory which stores a set of instruction code signals that control the operation of the printer control processor 205. The signal processor program memory 222 stores a set of instruction code signals that control the operation of the printhead signal processor 213. As is well known in the art, the non-volatile memory 217 retains the information signals stored therein indefinitely independent of whether power is supplied thereto.

The image memory 207 receives image pixels I(j,k) of the image originating in the image signal source 201 where j = 1, 2, ..., J are the rows of the image and k = 1, 2, ..., K are the columns of the image. In the image memory 207, the image pixels are organized as print pixels P(m,n) where m = 1, 2, ..., M are the successive print lines of the image and n = 1, 2, ..., N are the successive pixels of each print line m. For example, the image may comprise 2048 print lines each having 2048 pixels. The printhead processing memory 211 stores a subset of the successive lines of pixels including the pixels of the image signal line being converted, a plurality of successive rows m−r preceding the image line being converted and a plurality of successive rows m+r (e.g., r=2) succeeding the image line being converted for processing in the printhead signal processor 213. The printhead processing memory 211 and the printhead signal processor 213 cooperate to adjust the pixels of the current print line m with respect to the pixels of a plurality of lines already printed and a plurality of lines not yet printed.

Figure 3:
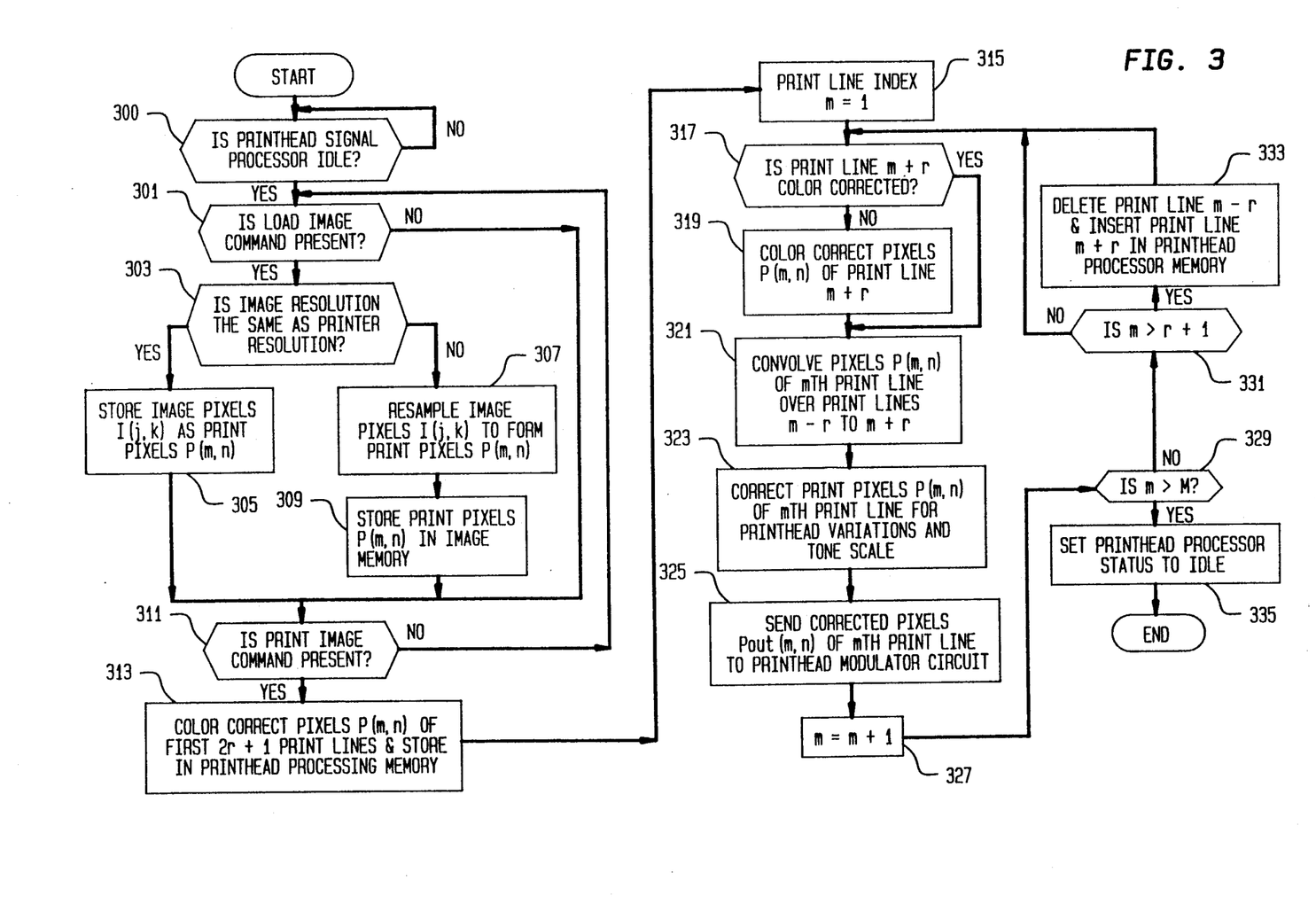
FIG. 3 is a flow chart illustrating the general operation of the printhead control circuit embodiment shown in FIG. 2 according to the present invention.

Referring now to FIG. 3, there is shown a flow chart illustrating the general operation of the printhead control circuit 200 shown in FIG. 2. The printhead control circuit 200 flow chart comprises a printhead signal processor idle decision step 300, a load image present decision step 301, an image and printer resolution decision step 303, a resample image operation step 307, store image pixels operation steps 305 and 309, a print image command present step 311, a pixel color correction and store operation step 313, a print line index setting step 315, a print line color correction decision step 317, a pixel color correction step 319, a pixel convolving step 321, a print pixel correction step 323, a corrected pixel sending step 325, a print line index incrementing step 327, print line index decision steps 329 and 331, a delete and insert print line step 333, and a set printhead processor to idle step 335. The steps of the flow chart of FIG. 3 correspond to the instruction code signals stored in the printer control processor memory 219 and the printhead signal processor memory 222.

In processing image signals, the printer control processor waits until it receives an idle state signal at its receive status port 221 from the send status port 227 of the printhead signal processor 213 as per the step 300. Upon receipt of the idle status signal, a load image command signal is transferred from the send command port 223 of the printer control processor 205 to the command receive port 225 of the printhead signal processor. If the load image command signal is not detected at the command receive port 225 in step 301, step 311 is entered to detect the presence of the print image command at the command receive port 225.

Upon detection of the load image command in step 301, the resolution of the image to be printed from image signal source 201 in FIG. 2 is compared to the resolution of the printer in the printer control processor 205 in accordance with step 303. The image resolution corresponds to the number of pixels or dots per inch of a print line. In the event the image resolution is the same as the printer resolution, the image pixels I(j,k) from image signal source 201 are stored in the image memory 207 as print pixels P(m,n) in step 305 and decision step 311 is entered to await a print image command. When the image resolution differs from the printer resolution in the step 303, the image pixels I(j,k) are resampled in the printhead signal processor 213 to form a set of print pixels P(m,n) at the resolution of the printer in step 307. The resampled print pixels P(m,n) are then stored in the image memory 207 of FIG. 2 as per step 309 and decision step 311 is entered.

Figure 4:
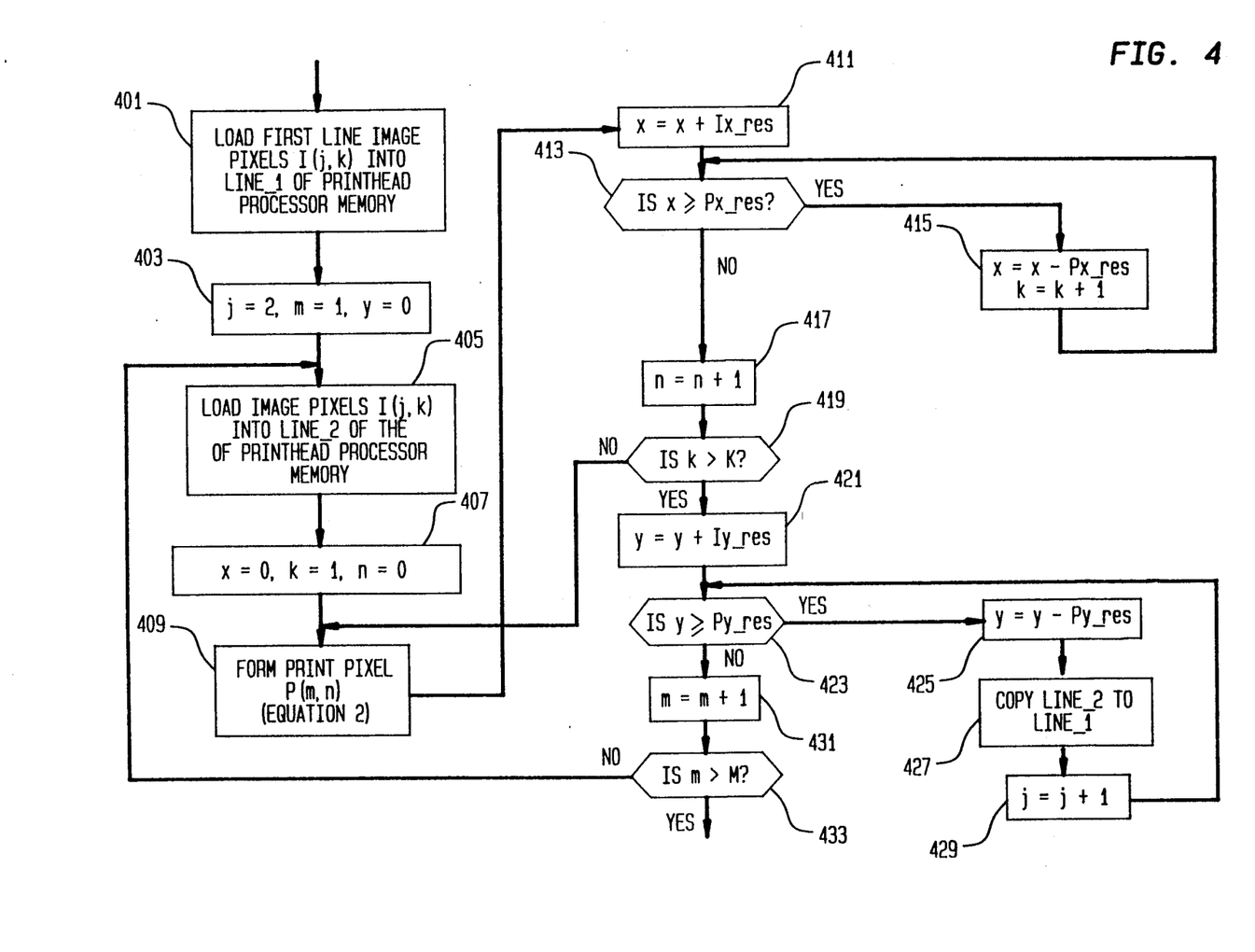
FIG. 4 is a flow chart illustrating in greater detail the resampling operations of the control circuit embodiment shown in FIG. 2 according to the present invention.

Referring now to FIG. 4, there is shown a flow chart illustrating in greater detail the resampling of image pixels I(j,k) stored in the image memory 207 into the set of print pixels P(m,n) at the resolution of the printer of the step 307. The image to be printed, for example, may have a resolution of 100 dots per inch while the printer produces a copy of the image at a fixed resolution of 200 dots per inch. If the 100 dot per inch image is printed at the 200 dot per inch resolution, the resulting copy will be reduced by a factor of 2. By rescaling, the image resolution is changed so that printing is done without reduction or enlargement of size. Assume for purposes of illustration that the image resolution in both the x (horizontal) and y (vertical) directions is 100 pixels per inch but the printer pixel resolution is 200 pixels per inch.

Figure 8:
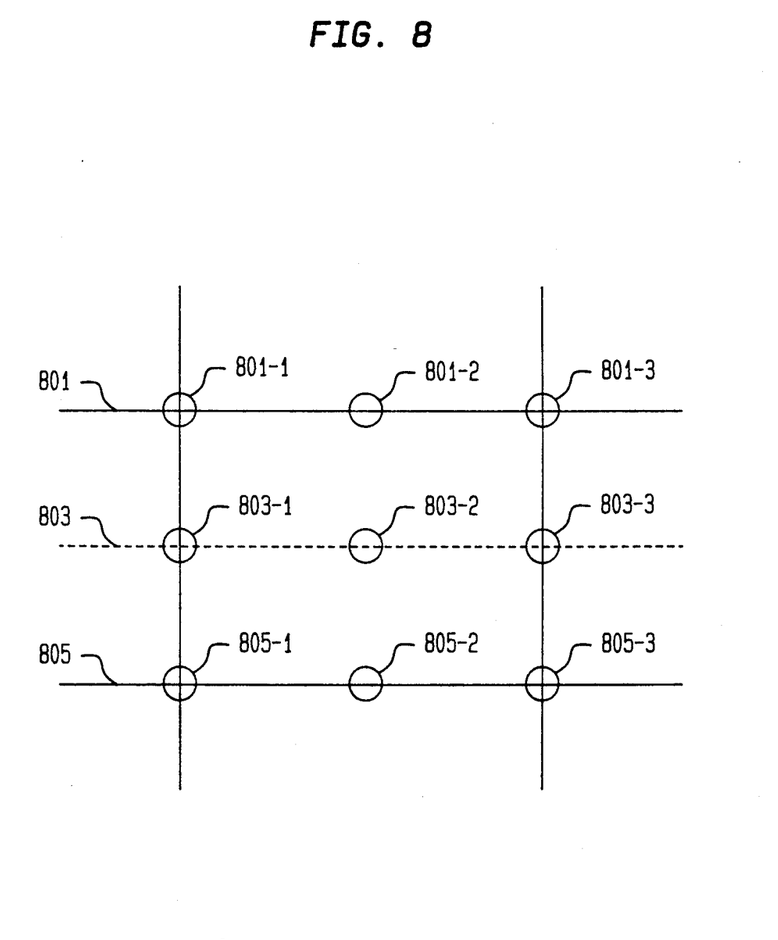
FIG. 8 is a graph illustrating the resampling operations of the flow chart of FIG. 4.

Referring now to FIG. 8, there is shown a graph illustrating the rescaling arrangement. The graph of FIG. 8 shows a portion of two successive image lines 801 and 805. Image line 801 includes the pixel locations 801-1 and 801-3 at which there are successive image pixels I(j,k) and I(j,k+1). Image line 805 includes the pixel locations 805-1 and 805-3 at which there are successive image pixels I(j+1,k) and I(j+1,k+1). The distance between lines 801 and 805 is the reciprocal of the vertical image resolution Iy_res and the distance between the locations 801-1 and 801-5 is the reciprocal of the horizontal image resolution Ix_res. Where the printer resolutions Px_res and Py_res (200 pixels per inch) are twice the image resolution (100 pixels per inch), there are print pixels P(m,n) at the locations 801-1 and 801-3 of image pixels on line 801 and an additional printer pixel at location 801-2 midway between locations 801-1 and 801-3 on line 801. Similarly, there are printer pixels P(m,n) at the locations 805-1 and 805-3 of image pixels on line 805 and an additional printer pixel at location 805-2 midway between locations 805-1 and 805-3 on line 805. In addition, there are printer pixels at locations 803-1, 803-2 and 803-3 on the dashed line 803 midway between lines 801 and 805. The values of the printer pixels at locations 801-1, 801-3, 805-1 and 805-3 are the same as the image pixels at these locations. The values of the other printer pixels at locations 801-2, 803-1, 803-2, 803-3, and 805-2 are Obtained by forming a distance weighted average of the image pixels at locations 801-1, 801-3, 805-1 and 805-3.

Rescaling to form print pixels is accomplished by resampling the image pixels in accordance with $$P(m,n) = [1/(Px\_res)(Py\_res)][(Px\_res-x)+(Py\_res-y) I(j,k)+(Px\_res-x)(y)I(j+1,k)+(x)(Py\_res-y)I(j,k+1)+xyI(j+1,k+1)] \quad \text{Eq. (1)}$$

Assume for purposes of illustration that the distances x and y are measured from an origin at location 801-1 (x=0, y=0) so that location 801-3 is at (Ix_res,0), location 805-1 is at (0,Iy_res), location 805-3 is at (Ix_res,Iy_res). In accordance with equation 1, the print pixel at location 801-1 is I(j,k). The print pixel at location 801-3 is I(j,k+1). The print pixel at location 805-I is I(j+1,k) and the print pixel at location 805-3 is I(j+1,k+1). The density value of the print pixel at location 803-2 is the weighted average of the image pixels at locations 801-1, 801-3 805-1 and 805-3 in accordance with equation 1.

Referring again to the printhead control circuit 200 shown in FIG. 2, the resampling operations of the step 307 in FIG. 3 are performed by transferring successive pairs of the image lines in the image memory 207 to a pair of image line storage locations in the printhead processing memory 211. The pixels of the two successive lines are processed in accordance with equation 1 and are returned to the image memory 207.

Referring again to FIG. 4, the image resampling flow chart therein comprises a load first line image pixel step 401, an index setting step 403, a load second line image pixel step 405, an index setting step 407, a print pixel forming step 409, an x distance increment step 411, an x distance decision step 413, a distance adjusting step 415, a print pixel index incrementing step 417, an image pixel decision step 419, a y distance incrementing step 421, a y distance decision step 423, a y distance adjusting step 425, a copy line step 427, an image index incrementing step 429, a print line index incrementing step 431, and a last print line decision step 433.

In operation, the step 401 is entered from the "NO" output of the decision step 303 of FIG. 3. As per step 401, the pixels of the first image line in the image memory 207 of FIG. 2 are transferred to the printhead processor memory 211 via the FIFO coupler 209 and the printhead signal processor 213. The first line image pixels I(1,k) are stored in a line_1 location in the printhead processor memory 211. The image line index j, the print line index m and the y distance coordinate are set to 2, 1, and 0, respectively in the step 403. The pixels of the second image line are transferred from the image memory 207 into the line_2 locations of the printhead processor memory as per the step 405 and the x coordinate, the image pixel index k and the print pixel index n are set to zero, one and one, respectively, in the step 407. The print pixel signal is then formed for the first print pixel n=1 of the first print line m=1 in accordance with $$P(m,n) = [1/(Px\_res)(Py\_res)][(Px\_res-x)(Py\_res-y)I(line\_1,k)+(Px\_res-x)(y)I(line\_2,k)+(x)(Py\_res-y)I(line\_1,k+1)+xyI(line\_2,k+1)] \quad \text{Eq. (2)}$$

In equation 2, Px_res is the x distance printer resolution; Py_res is the y distance printer resolution; Ix_res is the x distance image resolution; and Iy_res is the y distance image resolution. Line_1 is the jth image line and line_2 is the j+1th image line.

The x (the horizontal distance) is incremented by the x distance image resolution Ix_res in the step 411 and compared to x distance printer resolution Px_res in the decision step 413. If the incremented x distance from the step 411 is less than the printer resolution Px_res, the step 417 is entered from the step 413 and the print pixel index n is incremented by one. As a result, the next print pixel P(m,n) is formed within the same group of immediately surrounding image pixels (e.g., the image pixel group shown in FIG. 8). When the x distance from the step 413 is greater than the x distance printer resolution Px_res, the x distance is reset to x−Px_res and k is incremented in the step 415. In this way, the image pixel group for equation 3 is shifted by one image pixel to the right. As long as the image pixel index k is less than the last pixel index K in the decision step 417, the print pixel forming step is reentered from the decision step 419 via the decision step 413 and the print pixel incrementing step 413. After the Kth (i.e., last) image pixel of the jth line is processed, the print pixels for the current print line m have been formed.

The step 421 is entered from the decision step 419 upon the completion of the print pixel formation of a print line. In the step 421, the y distance is incremented by the y distance image resolution Iy_res. The incremented y distance is compared to the printer resolution distance Py_res in the decision step 423. If the y distance in the step 423 is less than the y resolution distance Py_res, the print line index m is incremented in the step 431 so that the same successive image lines are retained. Otherwise, the y distance is lowered by the y printer resolution distance Py_res in the step 425. The line_2 pixel set is transferred to the line_1 (step 427) and the line index j is incremented in the step 429. As a result of the operations of the steps 425, 427 and 429, the group of image pixels is shifted down one image line. The decision step 423 is then reentered.

After the print line index m is incremented in the step 431, the decision step 433 is entered in which the current print line index m is compared to the last print line index M. Until the current index m is greater than the last index M, the load image pixels into line_2 step 405 is entered and the loop from the step 405 to the step 433 is iterated to form the print image pixels at the printer resolution. The print image signals P(m,n) generated in the printhead signal processor 413 are then transferred to the image memory 207 as per the step 309 in FIG. 3.

When the print image command is detected in the step 311, the print pixels P(m,n) for the first 2r+1 print lines (e.g., r=2) are processed in the printhead signal processor 213 to modify the color of the print pixels in the step 313 in accordance with empirically determined criteria. The modified pixels are stored in the printhead processing memory 211. In general, each print pixel P(m,n) of a color image has three components. For a blue, green, and red system, a pixel has a blue component pb, a green component pg and a red component pr. Nine empirically determined coefficients are stored in the non-volatile print control memory 217 of FIG. 2 for use in modifying the color of the print pixel. For color correction of the blue component, a blue-blue coefficient abb, a blue-green coefficient abg, and a blue-red coefficient abr are stored. For color correction of the green component, a green-blue coefficient agb, a green-green coefficient agg, and a green-red coefficient agr are stored. For color correction of the red component, a red-blue coefficient arb, a red-green coefficient arg, and a red-red coefficient arr are stored. For each print pixel, the pb, pg, and pr components are combined with the color correction coefficients to form the color corrected pixel components pb', pg', and pr' in accordance with $$pb' = (abb)pb + (abg)pg + (abr)pr \qquad \text{Eq. (3)}$$

$$pg' = (agb)pb + (agg)pg + (agr)pr \qquad \text{Eq. (4)}$$

$$pr' = (arb)pb + (arg)pg + (arr)pr \qquad \text{Eq. (5)}$$

Figure 5:
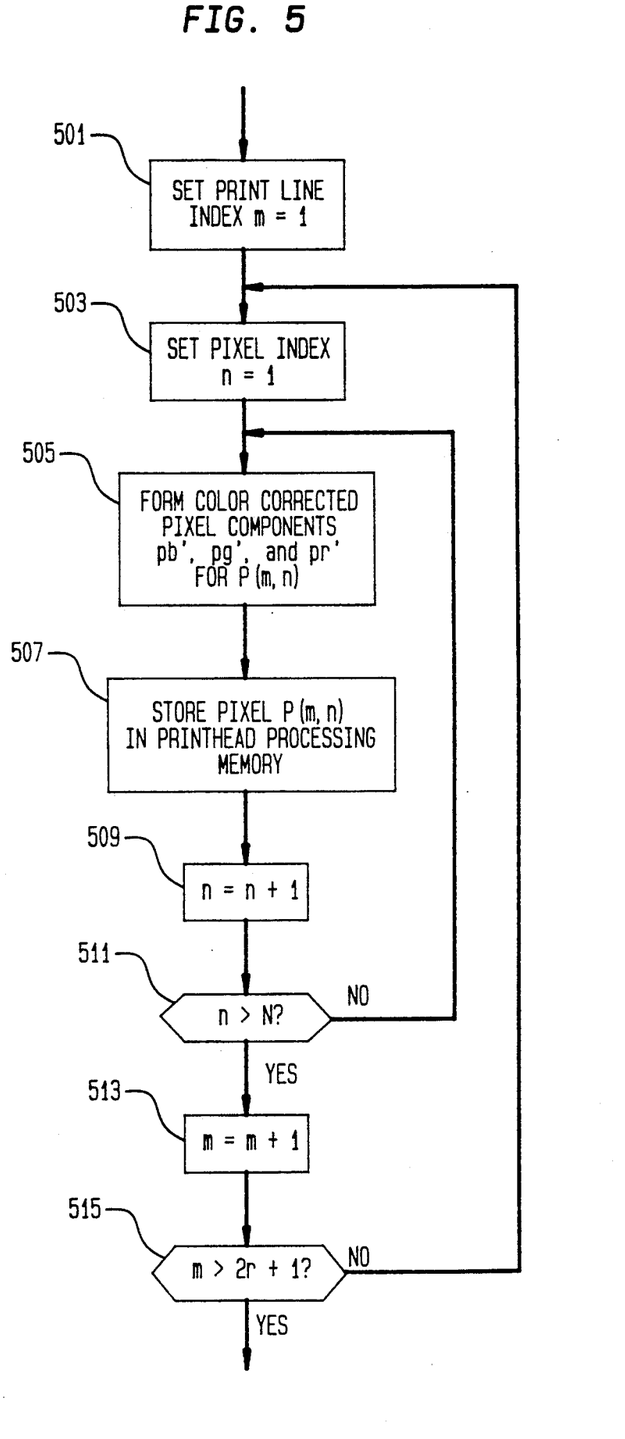
FIG. 5 is a flow chart illustrating in greater detail color correction operations of the control circuit embodiment shown in FIG. 2 according to the present invention.

Referring now to FIG. 5, there is shown a flow chart illustrating the color correction of the first 2r+1 print lines in the printhead control circuit of FIG. 2. The color correction flow chart comprises a print line index setting step 501, a pixel index setting step 503, a color correction operation step 505, a pixel storing step 507, a pixel index incrementing step 509, a pixel index decision step 511, a print line index incrementing step 513, and a print line index decision step 515. Initially, the print line index m is set to one (the step 501) and the pixel index n is set to one (step 503). The mth print line pixel P(m,n) is transferred from the image memory 207 to the printhead signal processor in which the pixel components pb, pg, and pr are processed according to equations 3, 4, and 5 (step 505). The processed print pixel is then stored in printhead processing memory 211. The pixel index n is incremented by one in the step 509 and until pixel index n is greater than the last pixel N of the print line in the step 511, the loop including steps 505, 507, 509 and 511 is iterated. After all the pixels of print line m have been color corrected, the print line index is incremented to m+1 in the step 513. After the last print line M is processed, the print line index setting step 315 of FIG. 3 is entered. In this way, the pixels of the initial print lines from m=1 to m=2r+1 are color corrected.

Referring again to FIG. 3, the print line index m is reset to one in the step 315 and the printhead signal processor is set to enter the color correction, convolution and printhead correction loop including steps 317, 319, 321, 323, 325, 327, 329, 331 and 333. In the decision step 317, it is determined whether the print line m has already been color corrected as one of the initial print lines in step 313. If so, the convolution step 321 is entered directly from the step 317. If not, the print line m+r is obtained from image memory 207 of FIG. 2 via FIFO coupler 209. The pixels are color corrected as described with respect to FIG. 5 and the convolution step 321 is entered. As is well known in the art, convolution is used to improve image pixels by modifying the value of a pixel as a function of surrounding pixels. In accordance with the present invention, the pixels of a plurality of successive print lines stored in printhead processor memory 211 of FIG. 2 are made available to th printhead signal processor 213. Each pixel [e.g., P(m,n)] is filtered by a finite impulse response having a prescribed number of elements corresponding to the surrounding pixels from P(m−r,n−a) to P(m+r,n+a). For example, r and a may each be 2 so that the convolution is done over a 5 by 5 matrix centered at pixel P(m,n). The convolution is thereby performed over a large group of surrounding pixels including pixels of both preceding and succeeding print lines.

In the circuit of FIG. 2, convolution is done for a pixel P(m,n) over the surrounding pixels from pixel P(m−r,n−r) to pixel P(m+r,n+r). This is done by multiplying each pixel value by a predetermined coefficient (e.g., c(j,k)P(m−r,n−r)), summing the resulting products and dividing the sum by a power of two in accordance with $$[\tfrac{1}{q}][\Sigma c(j,k)P(u,v)] \qquad \text{Eq. (6)}$$

over m−r<u<m+r, n−r<v<n+r, 1<j<2r+1, 1<k<2r+1 and where q is an integer. Convolution processing is limited to the interior pixels of the image. Consequently, The first and last r print lines and the first and last r pixels of each print line are not convolved and their values are passed directly from step 319 to step 323 of FIG. 3.

Figure 6:
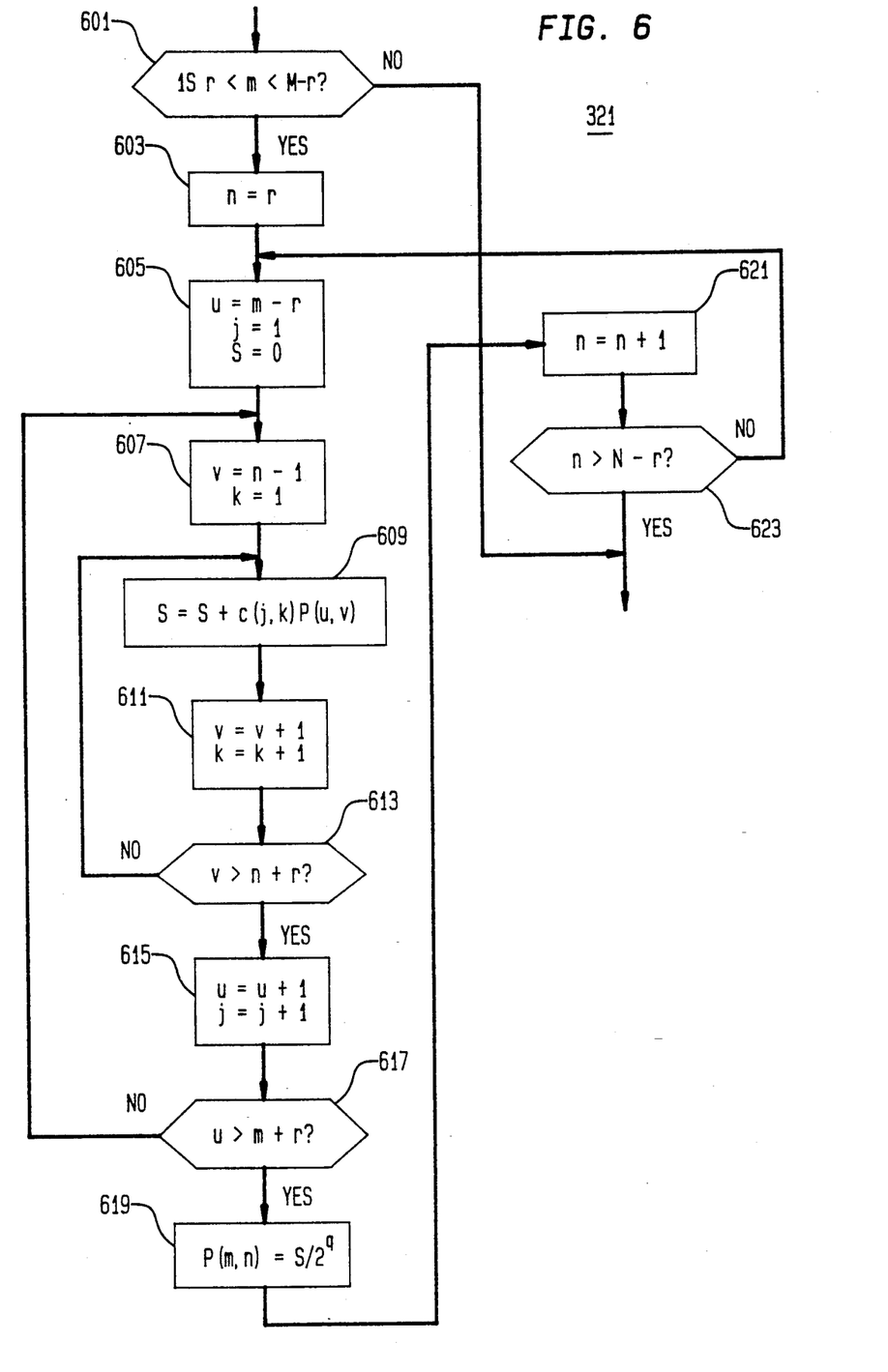
FIG. 6 is a flow chart illustrating in greater detail convolution operations of the control circuit embodiment shown in FIG. 2 according to the present invention.

Referring now to FIG. 6, there is shown a flow chart illustrating the convolution processing of step 321 of FIG. 3 in greater detail. The convolution processing flow chart comprises a print line range decision step 601, a pixel index setting step 603, convolution index setting steps 605 and 607, a convolution sum forming step 609, a convolution index incrementing step 611, a convolution index decision step 613, a convolution index incrementing step 615, a convolution index decision step 617, a convolution forming step 619, a pixel index incrementing step 623, and a pixel index decision step 623. The steps shown in FIG. 6 correspond to coded instructions permanently stored in the program memory 222 of the printhead signal processor 213.

In the convolution processing illustrated in FIG. 6, The decision step 601 is entered from the color correction step 319 of FIG. 3. In the step 601, the current print line is compared to the first print lines 1 through r and the last print lines M−r of the image. If the current print line is one of these outer edge print lines, no convolution processing is done and control is passed to the print pixel correction step 323. If the current print line is in the range between print line r+1 and M−(r+1), convolution processing of the print line pixels is started by initially setting the pixel index n to one (step 603). The print line index u and convolution coefficient index j are is set to m−r and 1, respectively, and the summation signal S is set to zero in the step 605.

The pixel index v and the convolution coefficient index k are set to n−r and 1, respectively, in the step 607. Product formation and summation for the current index values j, k, u, and v according to equation 6 is performed in the operation step 609 and the pixel index v and the convolution coefficient index k are incremented in step 611. Until the pixel index v is greater than n+r in the decision step 613, the loop including steps 609, 611 and 613 is iterated to generate the convolution sum for the current print line u. When pixel index v is greater than n+r, the print line index u and the convolution coefficient j are incremented in the step 617. Control is returned to the operation step 609 from the decision step 615 with the modified print line, pixel and convolution coefficient indices until the print line index u is greater than m+r in the decision step 617. At this time, the convolved pixel value P(m,n) is formed by dividing by $2^q$ in the operation step 619. The pixel index n is incremented in the step 621 and the convolution processing of the next pixel of the print line is initiated in the index setting step 605 through the decision step 623. When pixel index n is greater than N−r in step 623, the convolution processing of the current print line n is completed and the print pixel correction step 323 is entered.

Figure 7:
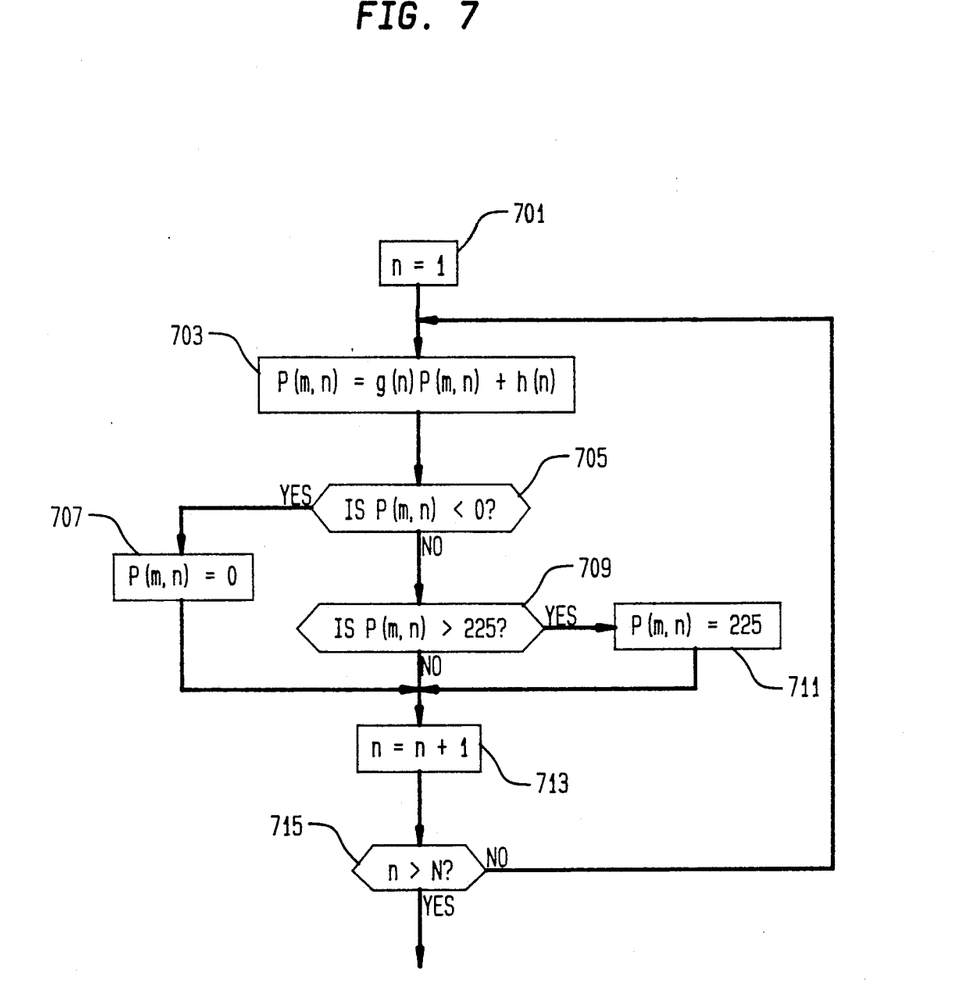
FIG. 7 is a flow chart illustrating in greater detail printhead correction operations of the control circuit embodiment shown in FIG. 2 according to the present invention.

Referring now to FIG. 7, there is shown a flow chart illustrating the printhead correction processing of step 323 of FIG. 3 in greater detail. The printhead processing step 323 in FIG. 7 comprises a pixel index setting step 701, a pixel value forming step 703, pixel value decision steps 705 and 709, pixel value setting steps 707 and 711, a pixel index incrementing step 713, and a last pixel index decision step 715. The steps shown in FIG. 7 correspond to coded instructions permanently stored in the program memory 222 of the printhead signal processor 213 of FIG. 2. As is well known in the art, there are variations among the heat elements of the printhead 26 of FIG. 1 (e.g., heat element resistance) which cause differences in print density. A set of signals gn and hn stored in the non-volatile memory 217 of FIG. 2 compensate for such variations of among the heating elements of the thermal printhead 26. To provide uniform printing, a correction signal is obtained empirically for each heat element of the printhead. The correction signal for the nth heat element, for example, comprising the gain component gn and the offset component hn is combined with the nth print pixel signal P(m,n) of the print line being modified.

In FIG. 7, the pixel index n is set to one in the step 701 to initially address the first pixel signal of the current print line m in the printhead processing memory 211. The addressed pixel is modified in the step 703 by multiplying the pixel value by the gain factor signal gn and adding the offset factor signal hn. Decision step 705 is entered to determine whether the corrected print pixel signal P(m,n) is within a permitted range between 0 and 255. If the print pixel value is less than 0 in step 705, it is set to zero in the step 707. Otherwise, the print pixel value obtained in the step 703 is compared to the maximum value 255 in the decision step 709. When the print pixel value is greater than 255 in the step 709, it is set to 255 in the step 711. In the event the print pixel value generated in the step 703 is within the permitted range, it is retained. The pixel index is incremented in the step 713 after it is formed in steps 703, 705, 707, 709, and 711.

The loop including steps 703, 705, 707, 709, 711 and 713 is iterated for the print pixels of the current print line. After the printhead correction has been completed for the last print pixel P(m,N) of the current print line being converted, the print pixels of the current print line m are sent to the printhead modulator 215 in accordance with the step 325 of FIG. 3.

Referring again to FIG. 3, the print line index m is incremented in the step 327 and the color correction decision step 317 is reentered through the steps including decision steps 329 and 331 and the print line replacement step 333. If the incremented print line index m is not greater than the last line index M in the decision step 329, the decision step 331 is entered wherein it is determined if the incremented print line is one of the r+1 lines initially placed in the printhead processing memory in the step 313. If m is greater than r+1, the print line m−r in the printhead processing memory is deleted and the print line m+r is inserted therein. Otherwise, the printhead processing memory is not altered. The print line m+r color correction decision step 317 is reentered from either the decision step 331 or the operation step 333. When the last print line M has been processed in the loop including steps 317, 319, 321, 323, 325, 327 and 329, the image processing is terminated and the printhead signal processor returns to its idle state in the step 335.

It is to be understood that the specific embodiments described herein are intended merely to be illustrative of the spirit and scope of the invention. Modifications can readily be made by those skilled in the art consistent with the principles of this invention.

What is claimed is:

1. Apparatus for printing a continuous tone image of fixed spatial resolution, comprising:
   (a) an image signal source for generating a set of successive lines of image signals representing image pixels corresponding to said continuous tone image;
   (b) converting means coupled to said image signal source for converting said successive lines of image signals into print signals representing print pixels, and each of said print signals having a value, said converting means including,
      (1) means for receiving said successive lines of image signals from said signal source,
      (2) first storage means for storing said set of successive lines of image signals from the signal source,
      (3) second storage means for storing a subset of said set of successive lines of said image signals from said first storage means, said subset including, (i) a selected line of image signals to be converted to said print signals,
(ii) a first plurality of lines of image signals that precede said selected line, and
(iii) a second plurality of lines of image signals that succeed said selected line;
(4) means for storing a set of coefficient signals including convolution coefficient signals, color correction signals, print head heat element correction coefficient signals, and values representing the print head and the image signal;
(5) signals processing means responsive to said subset of said image signals for converting said image signals into said print signals, including,
(i) means for convolving said subset of said image signals with said convolution coefficient signals to enhance edge data in said image,
(ii) means responsive to said subset of said image signals and said color correction coefficient signals to correct color in said image,
(iii) means responsive to said subset of said image signals and said print head heat element correction coefficient signals to correct element to element variations in said print head, and
(iv) means for detecting a difference between said partial resolution of said print head and said continuous tone image means responsive to said detected difference for resampling said subset of said image signals to form said print signals at said spatial resolution of said print head where said value of each print pixel is a prescribed weighted average of said subset of image signals; and
(c) a print head comprising a line of heating elements at a fixed spatial resolution coupled to said converting means responsive to said print signals for printing said print signals.

* * * * *